(12) United States Patent
Fladhammer

(10) Patent No.: US 11,371,594 B1
(45) Date of Patent: Jun. 28, 2022

(54) SUPPLEMENTAL DRIVER ASSEMBLY FOR ADJUSTER

(71) Applicant: Asyst Technologies L.L.C., Kenosha, WI (US)

(72) Inventor: Scott T. Fladhammer, Caledonia, WI (US)

(73) Assignee: Asyst Technologies L.L.C., Kenosa, WI (US)

( * ) Notice: Subject to any disclaimer, the term of this patent is extended or adjusted under 35 U.S.C. 154(b) by 0 days.

(21) Appl. No.: 17/203,408

(22) Filed: Mar. 16, 2021

(51) Int. Cl.
  *F16H 19/08* (2006.01)
  *F16H 1/04* (2006.01)
  *B60Q 1/068* (2006.01)

(52) U.S. Cl.
  CPC .............. *F16H 19/08* (2013.01); *F16H 1/04* (2013.01); *B60Q 1/068* (2013.01)

(58) Field of Classification Search
  CPC . B60Q 1/068; F16H 1/04; F16H 19/08; F16H 25/20
  See application file for complete search history.

(56) References Cited

U.S. PATENT DOCUMENTS

| | | | | |
|---|---|---|---|---|
| 5,079,676 A | * | 1/1992 | Lisak | B60Q 1/0683 81/484 |
| 5,165,775 A | * | 11/1992 | Lisak | B60Q 1/0683 362/524 |
| 5,214,971 A | | 6/1993 | Burton et al. | |
| 5,309,780 A | * | 5/1994 | Schmitt | B60Q 1/0683 362/524 |
| 5,351,170 A | * | 9/1994 | Nagengast | B60Q 1/0683 362/463 |
| 5,707,133 A | | 1/1998 | Burton | |
| 5,775,795 A | | 7/1998 | Christian et al. | |
| 6,042,254 A | * | 3/2000 | Burton | B60Q 1/0683 362/524 |
| 6,050,712 A | * | 4/2000 | Burton | B60Q 1/0683 362/284 |
| 6,257,747 B1 | * | 7/2001 | Burton | B60Q 1/0683 362/524 |
| 6,315,439 B1 | * | 11/2001 | Denley | F21S 41/675 362/463 |

(Continued)

OTHER PUBLICATIONS

Engineering drawing of a funnel extension product installed on a compact adjuster; Jan. 1, 2019.

*Primary Examiner* — David M Fenstermacher
(74) *Attorney, Agent, or Firm* — James A. Joyce; Godfrey & Kahn, S.C.

(57) ABSTRACT

A supplemental driver assembly is disclosed that includes a supplemental drive gear having an upper portion including a tool engagement recess and circumferential supplemental drive gear teeth, and a cylindrical neck extending axially from the upper portion to an output shaft having one or more drive engagement protrusions, as well as a drive guide housing with a gear pocket for housing the upper portion of the supplemental drive gear, the gear pocket including a cylindrical pocket wall extending from a perimeter of a pocket floor, the pocket wall having a drive guide passage extending therethrough for receiving a side adjuster tool, wherein the gear pocket receives the supplemental drive gear and allows for rotational movement of the upper portion within the gear pocket, and a cylindrical collar extending axially from the gear pocket.

20 Claims, 11 Drawing Sheets

(56) References Cited

U.S. PATENT DOCUMENTS

| | | | |
|---|---|---|---|
| 6,773,153 B2 | 8/2004 | Burton | |
| 7,004,607 B2* | 2/2006 | Aguinaga | B60Q 1/068 362/524 |
| 7,118,259 B2 | 10/2006 | Fladhammer | |
| 7,762,686 B2 | 7/2010 | Fladhammer | |
| 7,824,087 B2* | 11/2010 | Gattone | B60Q 1/0683 362/523 |
| 8,033,700 B2* | 10/2011 | Gattone | B60Q 1/0683 362/514 |
| 9,643,529 B2 | 5/2017 | Burton | |
| 9,709,235 B2 | 7/2017 | Burton | |
| 10,023,101 B2* | 7/2018 | Burton | B60Q 1/0683 |
| 10,266,107 B2* | 4/2019 | Burton | B60Q 1/2642 |
| 10,351,046 B2* | 7/2019 | Fladhammer | B60Q 1/0683 |
| 10,518,697 B2* | 12/2019 | Burton | B60Q 1/0683 |
| 2005/0145050 A1* | 7/2005 | Fladhammer | B60Q 1/0683 74/318 |
| 2011/0032716 A1* | 2/2011 | Burton | F21S 41/675 362/460 |
| 2014/0029278 A1* | 1/2014 | Burton | B60Q 1/068 362/523 |

* cited by examiner

SUPPLEMENTAL DRIVER ASSEMBLY FOR ADJUSTER

FIELD OF THE INVENTION

The invention relates generally to adjusters and more particularly to vehicle headlamp adjusters.

BACKGROUND OF THE INVENTION

The invention relates generally to adjusters that are used to adjust the aim of a vehicle lamp, and more particularly to a supplemental driver assembly for use with a vehicle lamp adjuster. Vehicles such as automobiles typically have several lamps including head lamps and fog lamps. These lamps generally include a housing supporting a reflector and a lens with a bulb mounted therebetween, and are often securely fit into mounting brackets attached to the vehicle. Together, a lamp and a mounting bracket form a complete lamp assembly. Once the lamp assembly has been manufactured and installed into a vehicle, the lamp must be adjusted to the proper aim. As a result of accidents, maintenance, and normal vibrations and wear, the aim of the lamp must be occasionally adjusted during the lifetime of the vehicle as well.

One method of adjusting the aim of the lamp involves using an adjuster. The adjuster may be formed as part of the mounting bracket or may be a separate part that communicates with both the lamp and the mounting bracket. One known type of adjuster comprises an adjuster housing with a ball stud extending therefrom. The ball stud is engaged to the lamp. The adjuster housing of the adjuster has an opening and a gear positioned inside the housing. The gear is functionally engaged to the ball stud. An input shaft is coupled to the gear. Actuation of the input shaft results in rotation of the gear and the engaged ball stud. The gear translates actuation of the input shaft into movement of the ball stud. Such movement causes the lamp to pivot or otherwise move with respect to the mounting bracket, thereby adjusting the aim of the lamp.

BRIEF SUMMARY OF THE INVENTION

In at least some embodiments, the invention relates to a supplemental driver assembly that includes a supplemental drive gear comprising: an upper portion including a tool engagement recess and circumferential supplemental drive gear teeth; and a cylindrical neck extending axially from the upper portion to an output shaft having one or more drive engagement protrusions; as well as a drive guide housing comprising: a gear pocket for housing the upper portion of the supplemental drive gear, the gear pocket comprising a cylindrical pocket wall extending from a perimeter of a pocket floor, the pocket wall having a drive guide passage extending therethrough for receiving a side adjuster tool, wherein the gear pocket receives the supplemental drive gear and allows for rotational movement of the upper portion within the gear pocket; and a cylindrical collar extending axially from the gear pocket.

In at least some other embodiments, the invention relates to supplemented adjuster comprising: a primary drive gear with an input shaft having primary drive gear teeth at a first end and an engagement cavity at a second end; a ball stud gear having a cylindrical body and ball stud gear teeth matingly engaged with the primary drive gear teeth to provide rotation of the ball stud gear; a ball stud matingly engaged with the ball stud gear, wherein rotation of the ball stud gear rotates the ball stud; an adjuster housing for receiving at least partially therein, the ball stud gear, the ball stud, and the primary drive gear, the adjuster housing including an annular header extending from an upper surface; a supplemental drive gear comprising: an upper portion including a tool engagement recess and circumferential supplemental drive gear teeth; a cylindrical neck having a neck bottom and extending axially from the upper portion to an output shaft having one or more drive engagement protrusions, wherein the drive engagement protrusions are matingly received within the engagement cavity to provide a rotational interlock therebetween; and an engagement head extending from the output shaft; a drive guide housing comprising: a gear pocket for housing the upper portion of the supplemental drive gear, the gear pocket comprising a cylindrical pocket wall extending from a perimeter of a pocket floor, the pocket wall having a drive guide passage extending therethrough for receiving a side adjuster tool, wherein the gear pocket receives the supplemental drive gear and allows for rotational movement of the upper portion within the gear pocket; and a cylindrical collar extending axially from the gear pocket, wherein the collar is selectively coupled to the annular header of the adjuster housing, and wherein rotation of the supplemental drive gear via the tool engagement recess provides rotation of the primary drive gear and the ball stud.

Other embodiments, aspects, and features of the invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. In the drawings.

DETAILED DESCRIPTION

Figure 1:
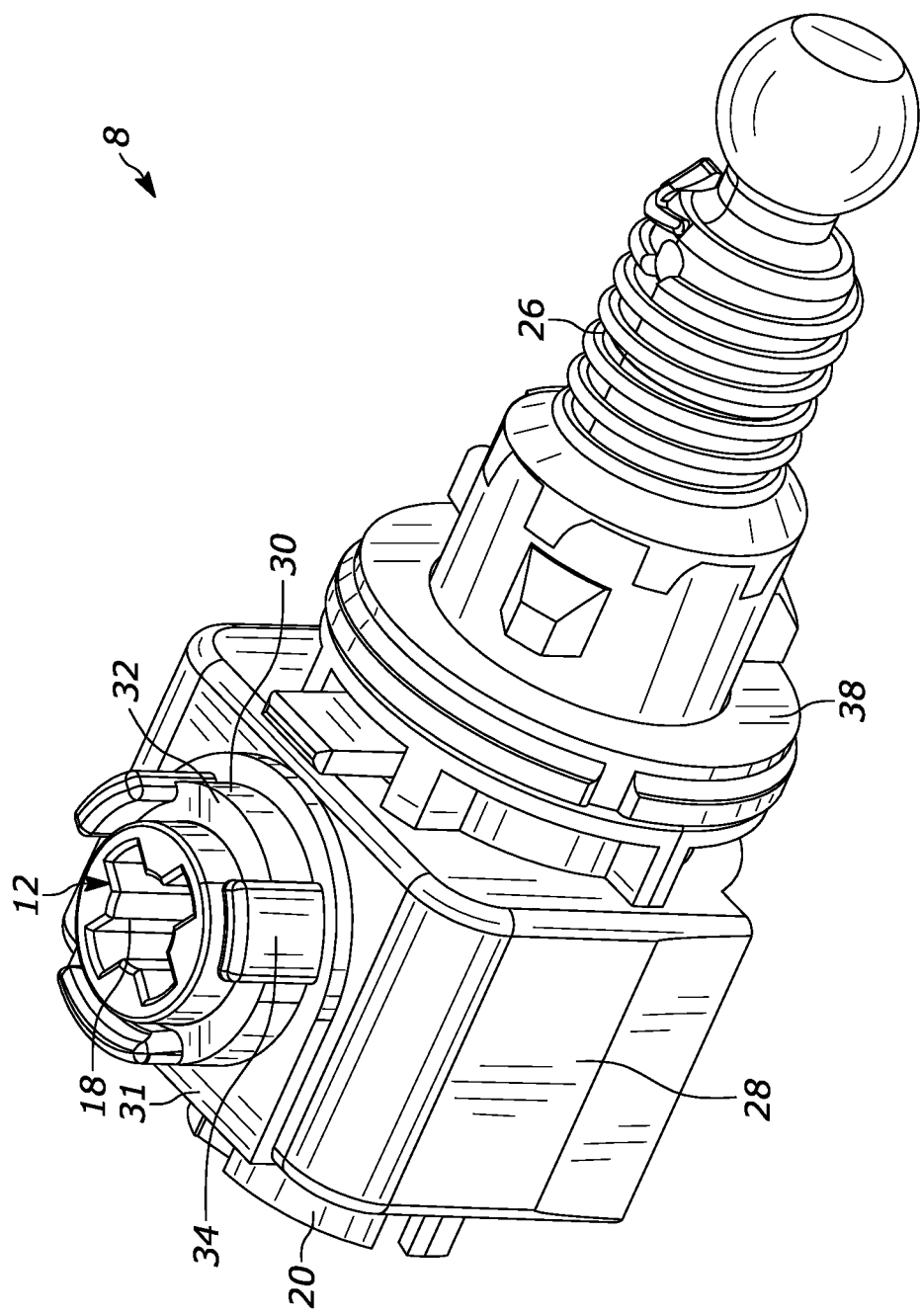
FIG. 1 is a perspective view of an exemplary adjuster.
Figure 2:
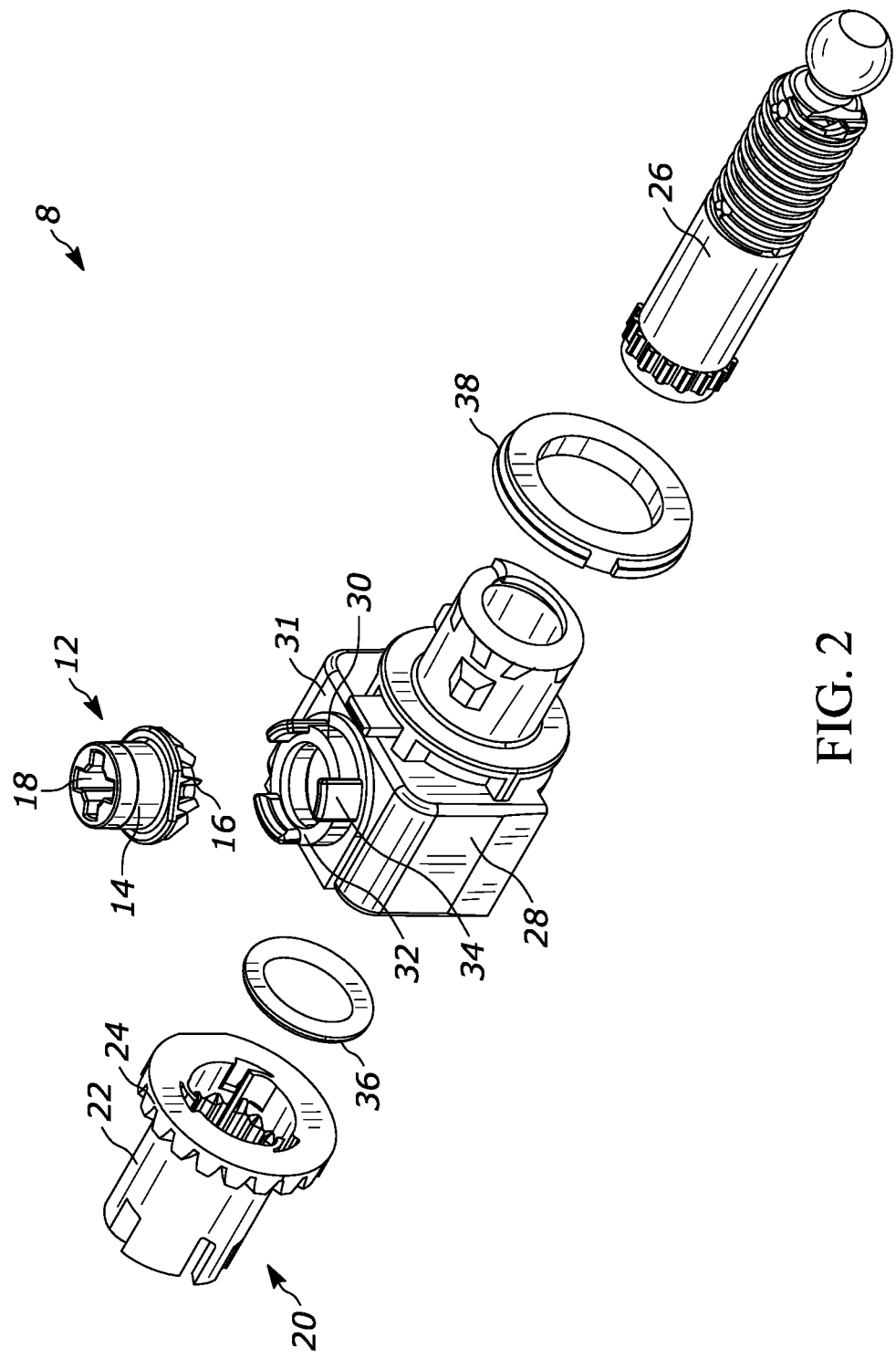
FIG. 2 is an exploded view of the adjuster of FIG. 1.
Figure 3:
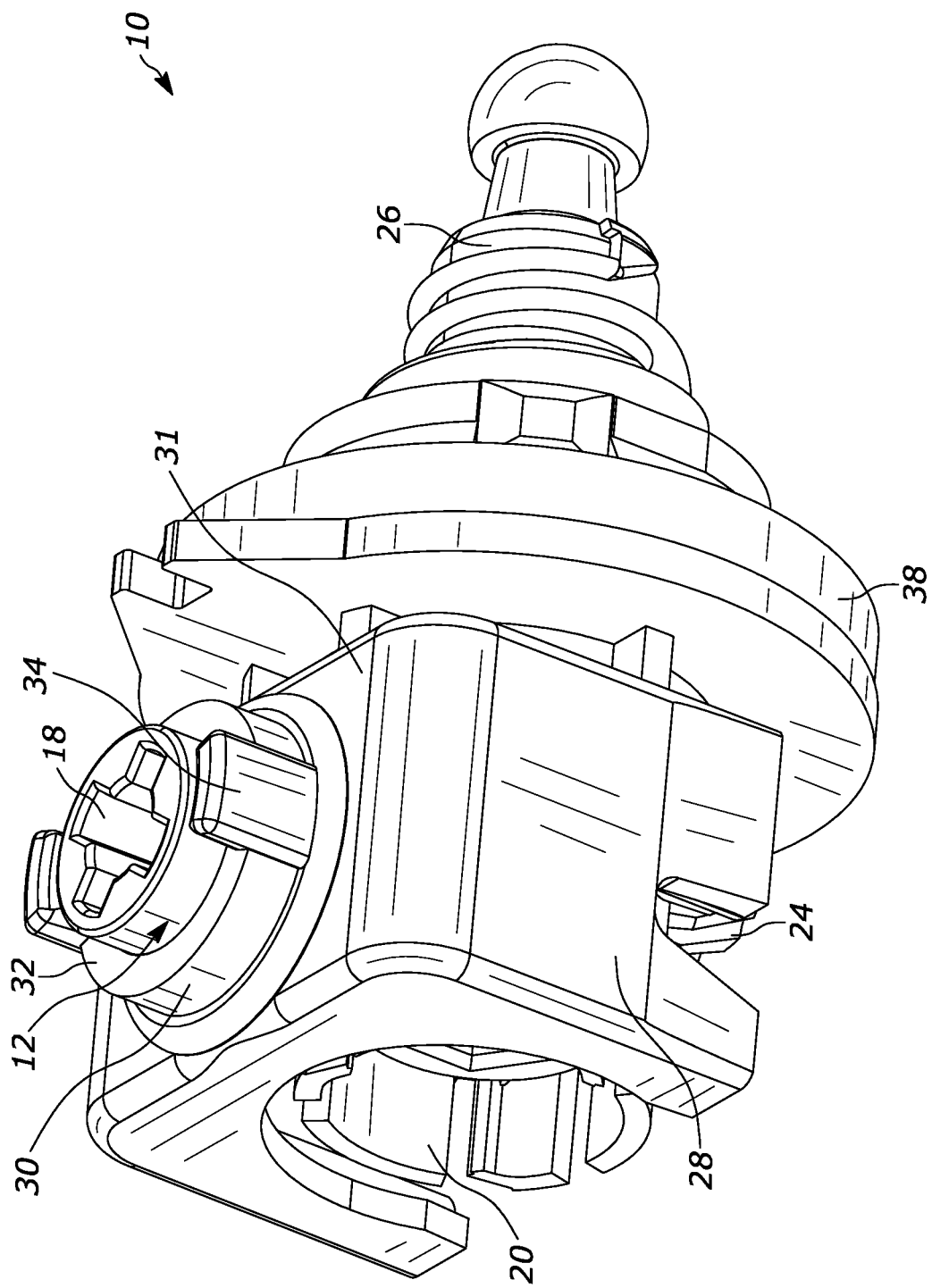
FIG. 3 is a perspective view of another exemplary adjuster.
Figure 4:
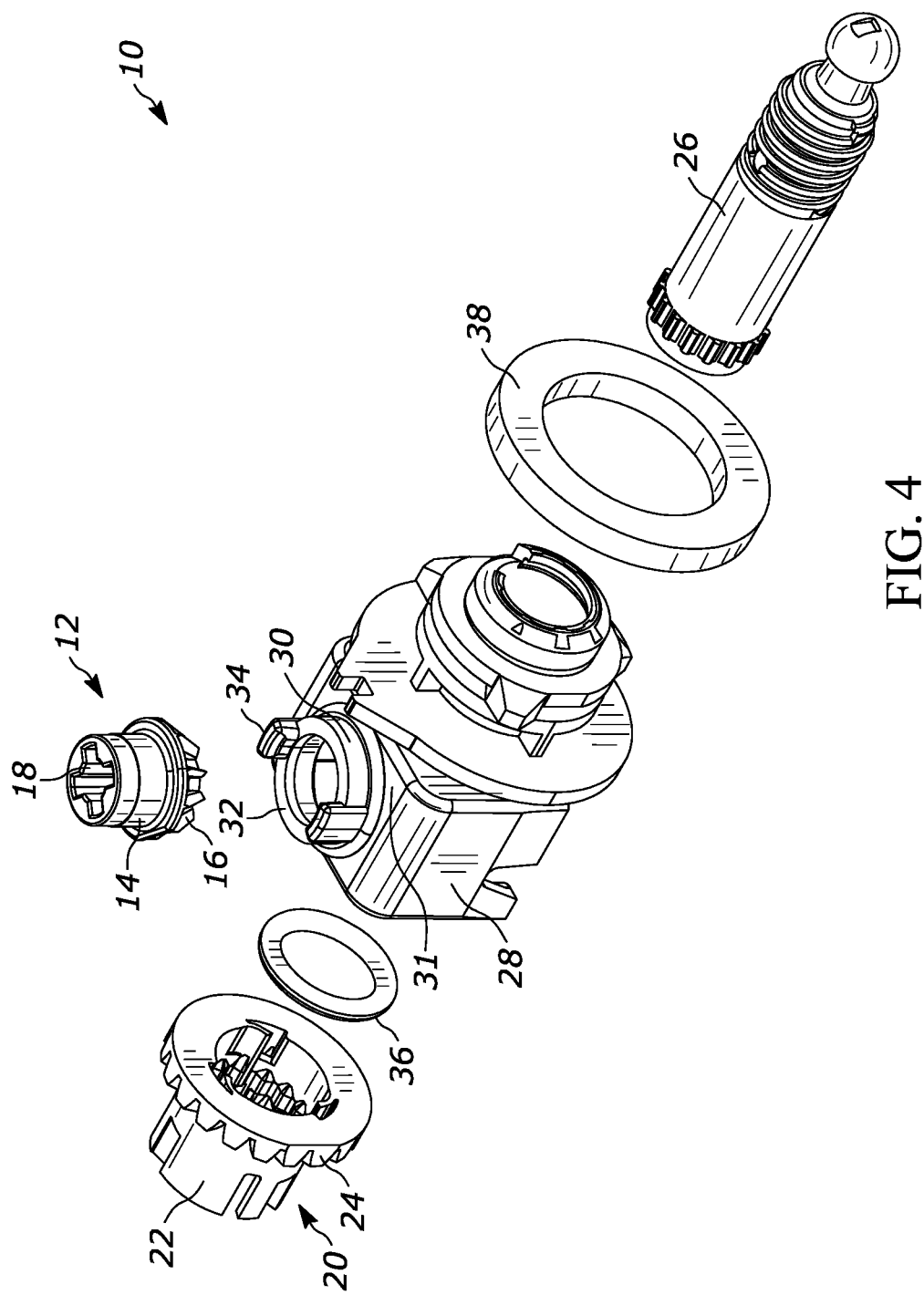
FIG. 4 is an exploded view of the adjuster of FIG. 3.
Figure 5:
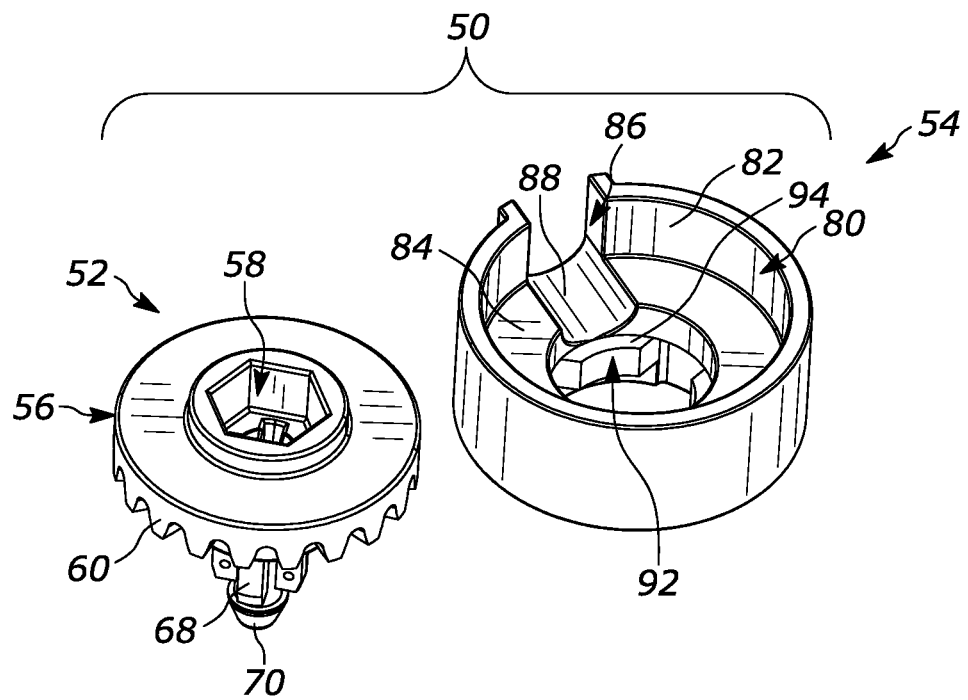
FIG. 5 is a top perspective view of an exemplary supplemental driver assembly.
Figure 6:
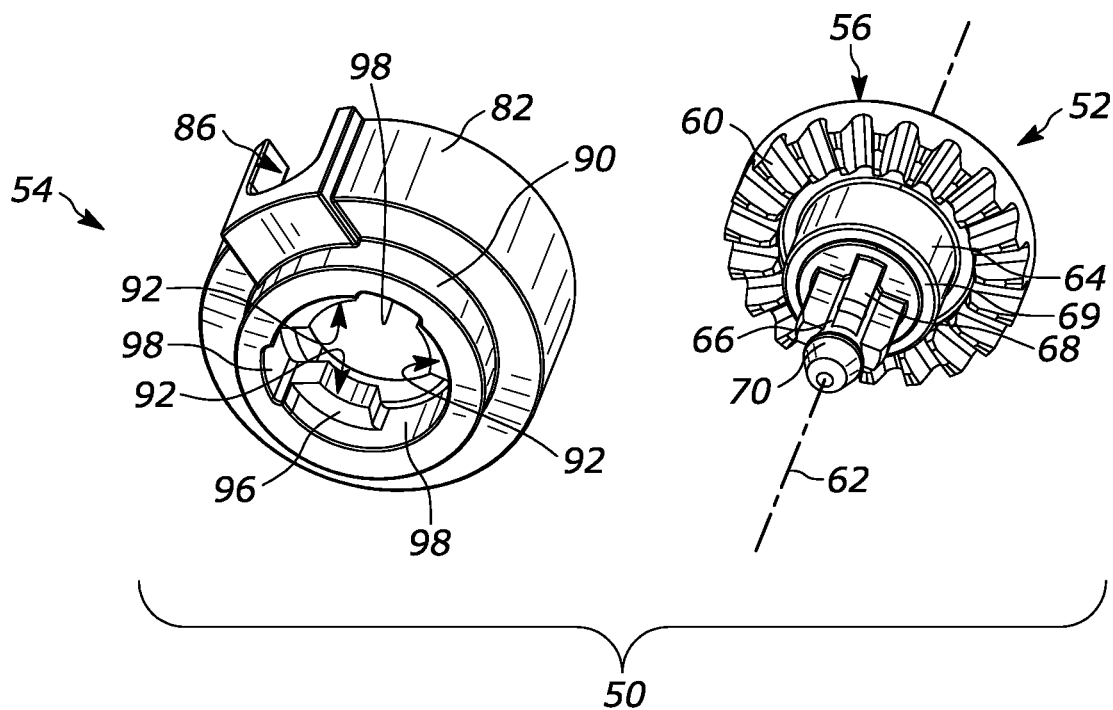
FIG. 6 is a bottom perspective view of the supplemental driver assembly of FIG. 5.
Figure 7:
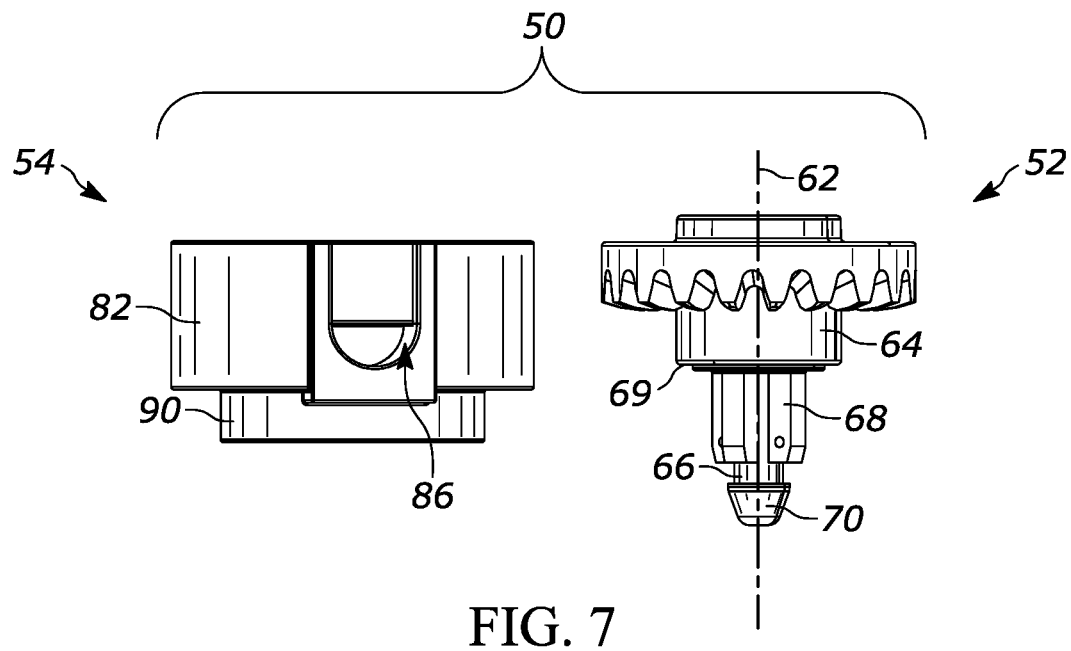
FIG. 7 is a front view of the supplemental driver assembly of FIG. 5.
Figure 8:
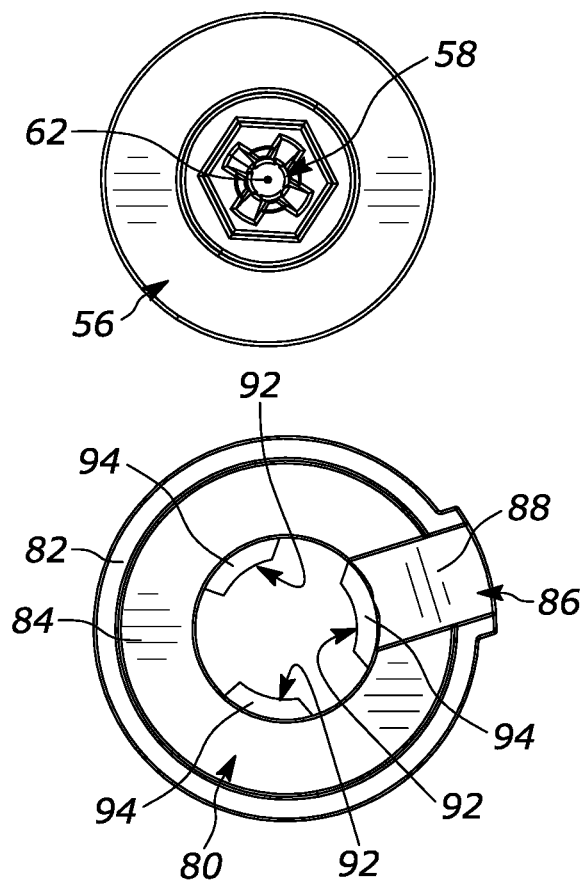
FIG. 8 is a top view of the supplemental driver assembly of FIG. 5.
Figure 9:
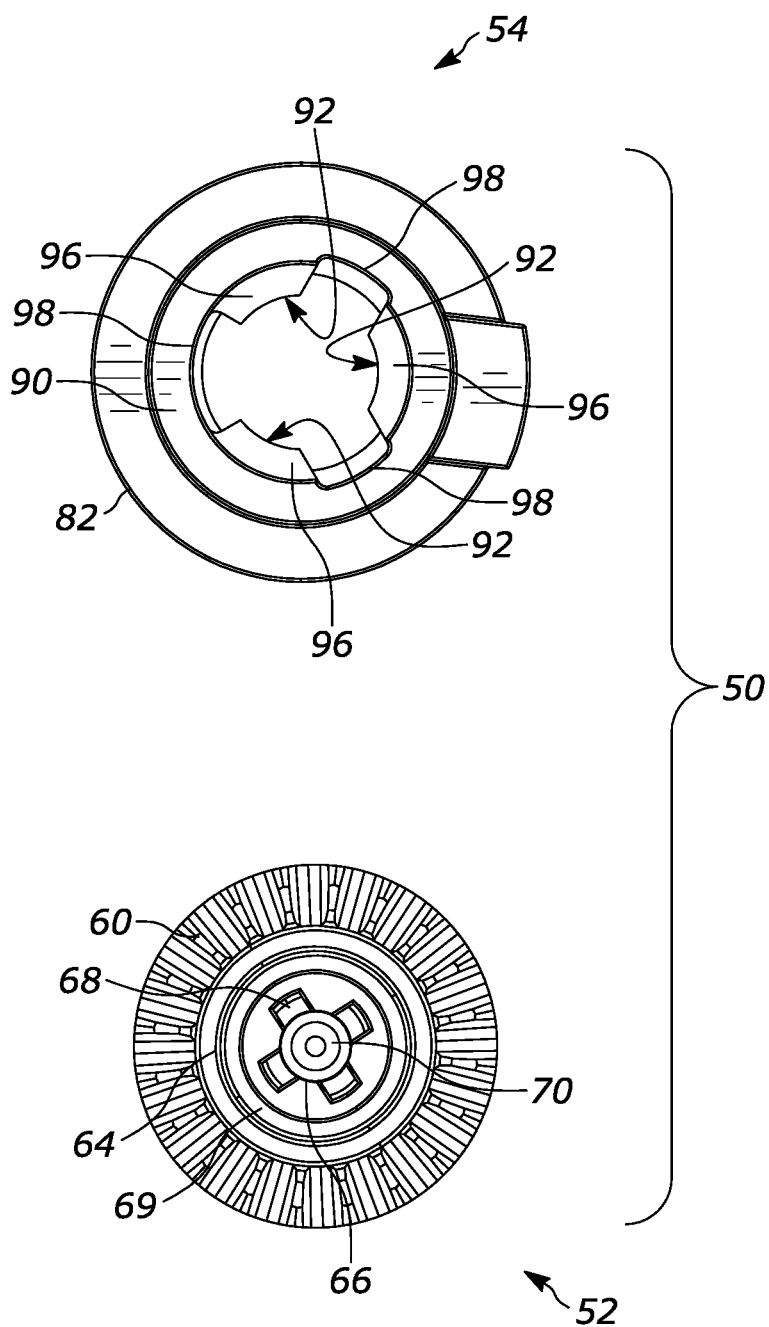
FIG. 9 is a bottom view of the supplemental driver assembly of FIG. 5.

The supplemental driver assembly is intended for use with a typical vehicle lamp adjuster. Such lamp adjusters can include numerous variants, such as those disclosed in U.S. Pat. Nos. 5,214,971, 5,707,133, 5,775,795, 6,474,850, 6,773153, 6,257,747, 6,913,374, 7,118,259, 7,762,686, 9,643,529, and 9,709,235, all of which are incorporated by reference herein. Two exemplary prior art adjusters are shown in FIGS. 1-4. More particularly, FIGS. 1-2 illustrate perspective and exploded views of exemplary adjuster 8, while FIGS. 3-4 illustrate perspective and exploded views of another exemplary adjuster 10. The adjusters 8, 10 include similar components and have similar function and therefore generally utilize similar element numbers herein. More particularly, the adjusters 8, 10 each include a primary drive gear 12 with an adjuster input shaft 14 having primary drive gear teeth 16 at a first end and an engagement cavity 18 at a second end. A ball stud gear 20 is also provided, having a cylindrical body 22 and ball stud gear teeth 24 that matingly engage with the primary drive gear teeth 16 to provide rotation of the ball stud gear 20. Further, a ball stud 26 is provided and engaged with the ball stud gear 20, wherein rotation of the primary drive gear 12 in turn rotates the ball stud 26 via the ball stud gear 20. The adjusters 8, 10 also each include an adjuster housing 28 for receiving at least partially therein, the ball stud gear 20, the ball stud 26, and the primary drive gear 12, the adjuster housing including an annular header 30 extending from a housing upper surface 31 and having an annular header top surface 32. In at least some embodiments, the adjusters 8, 10 can each include one or more alignment tabs 34 extending from the annular header 30 and/or the housing upper surface 31.

The adjusters 8, 10 are referenced herein for exemplary use with the supplemental driver assembly, although it shall be understood that the supplemental driver assembly can be utilized with various other adjusters and is not limited to use with adjusters 8, 10. For convenience, adjuster 8 shall be generally referenced herein, although it shall be understood that the term adjuster can include other known adjusters of varying shape and configuration and therefore use of the supplemental driver assembly is not limited to adjuster 8.

Referring now to FIGS. 5-9 an exemplary embodiment of a supplemental driver assembly 50 comprising a supplemental drive gear 52 and a supplemental drive guide housing 54, is shown in respective top perspective, bottom perspective, front, top, and bottom views. The supplemental driver assembly 50 can take many forms and is configured to be coupled to an adjuster. In at least some embodiments, the supplemental drive gear 52 includes an upper portion 56 having a central tool engagement recess 58 and circumferential supplemental drive gear teeth 60, the supplemental drive gear 52 having a central longitudinal axis 62 extending therethrough, with the central tool engagement recess 58 and circumferential supplemental drive gear teeth 60 centered about the axis 62. The tool engagement recess 58 is sized and shaped to be matingly engaged by a top adjuster tool 61 (e.g., see FIGS. 16 and 17), for example, a Torx drive, hex wrench, Philips-head, etc. In at least some embodiments, a cylindrical neck 64 is centered about the axis 62 and extends axially from the upper portion 56 to an output shaft 66 having one or more drive engagement protrusions 68, wherein the drive engagement protrusions 68 are matingly received within the engagement cavity 18 of the adjuster 8 to provide a rotational interlock therebetween. The neck 64 includes a neck bottom 69. In at least some embodiments, the drive engagement protrusions 68 take the form of one or more splines extending longitudinally along the output shaft 66. The supplemental drive gear 52 can further include an engagement head 70 that extends axially from the output shaft 66. The engagement head 70 can take many forms and generally serves as a locking feature for engagement with the engagement cavity 18 of the adjuster 8, wherein in at least some embodiments, the engagement head 70 is tapered and includes a circumferential upper ledge 72 that is engaged by one or more outwardly biased locking tabs 19 (see FIG. 14) within the engagement cavity 18 of the adjuster input shaft 14, to longitudinally secure the supplemental drive gear 52 within the adjuster input shaft 14. In at least some embodiments, other forms of locking mechanisms can be utilized to secure the supplemental drive gear 52 to the input shaft 14, with or without one or both of the engagement head 70 and locking tabs 19, such as press fit, adhesive bonding, sonic welding, mechanical fastener, etc.

Figure 10:
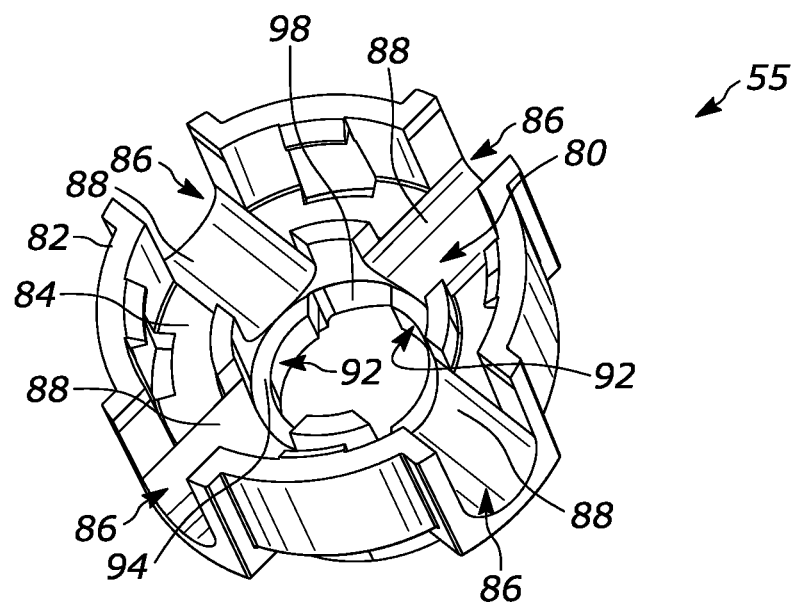
FIG. 10 is a top perspective view of another embodiment of a supplemental drive guide housing.
Figure 11:
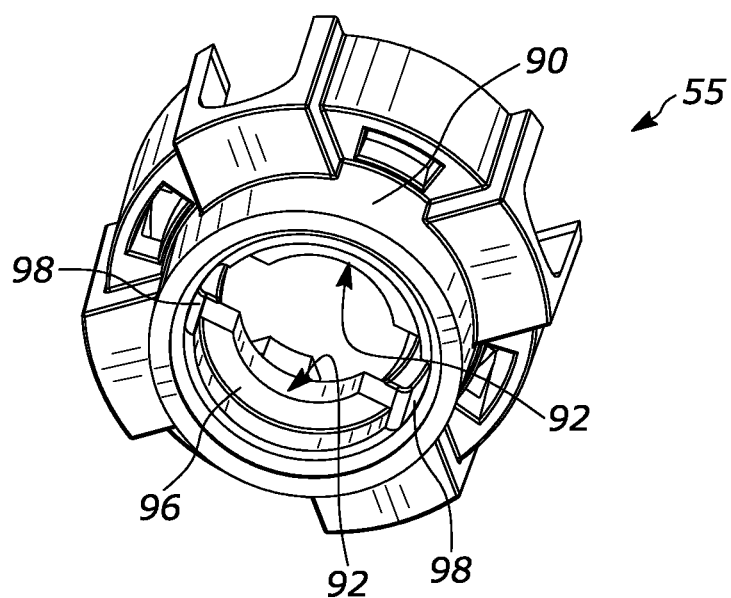
FIG. 11 is a bottom perspective view of the supplemental drive guide housing of FIG. 10.

The supplemental drive guide housing 54 receives and interfaces with the supplemental drive gear 52. The supplemental drive guide housing 54 includes a gear pocket 80 for housing the upper portion 56 of the supplemental drive gear 52, wherein the gear pocket 80 receives the supplemental drive gear 52 and allows for rotational movement of the upper portion 56 within the gear pocket 80. In at least some embodiments, the gear pocket 80 includes a cylindrical pocket wall 82 extending perpendicularly from a perimeter of a pocket floor 84, the pocket wall 82 having a drive guide passage 86 extending therethrough for receiving a side adjuster tool 87 (e.g., a Phillips-head screwdriver, etc.)(e.g., see FIGS. 16 and 17) for engagement with the supplemental drive gear teeth 60 to cause rotation of the supplemental drive gear 52. In at least some embodiments, the drive guide passage 86 further includes a groove 88 extending through both the pocket wall 82 and the pocket floor 84 of the supplemental drive guide housing 54. The supplemental drive guide housing 54 can be configured to include two or more drive guide passage 86, such as shown in FIGS. 10-11 illustrating another embodiment of a supplemental drive guide housing 55 having four drive guide passages 86. In addition, during manufacturing the drive guide passage 86 can be positioned anywhere along the 360 degree circumference of the pocket wall 82 and at various angles (i.e., lead-in angle) to provide a desired side adjuster tool receiving position and angle relative to the adjuster.

The supplemental drive guide housing 54 can further include a cylindrical collar 90 extending axially below the gear pocket 80, wherein in at least some embodiments, the collar 90 is sized and shaped to matingly receive at least partially therein the annular header 30 of the adjuster. In at least some embodiments, the collar 90 includes one or more radially inward extending protrusions 92 each having an upper shoulder 94 and a lower shoulder 96, wherein the upper shoulder 94 can receive at least in part, a neck bottom 69 of the neck 64 rotatably thereon and the lower shoulder 96 is receivable on the annular header top surface 32. In at least some embodiments, the protrusions 92 are arc-shaped. In addition, the collar 90 can include one or more vertical alignment slots 98, wherein in at least some embodiments, the alignment slots 98 are situated between the protrusions 92. The alignment slots 98 are spaced to receive the alignment tabs 34 extending from the annular header 30 of the adjuster 8 as shown in FIGS. 1-2. Although three alignment slots 98 are shown in FIGS. 5-9, more or less alignment slots 98 can be provided. For example, as shown in FIGS. 10-11, two alignment slots 98 can be provided to coincide with two mating alignment tabs 34 extending from the annular header 30 of the adjuster 10 shown in FIGS. 3-4.

Figure 12:
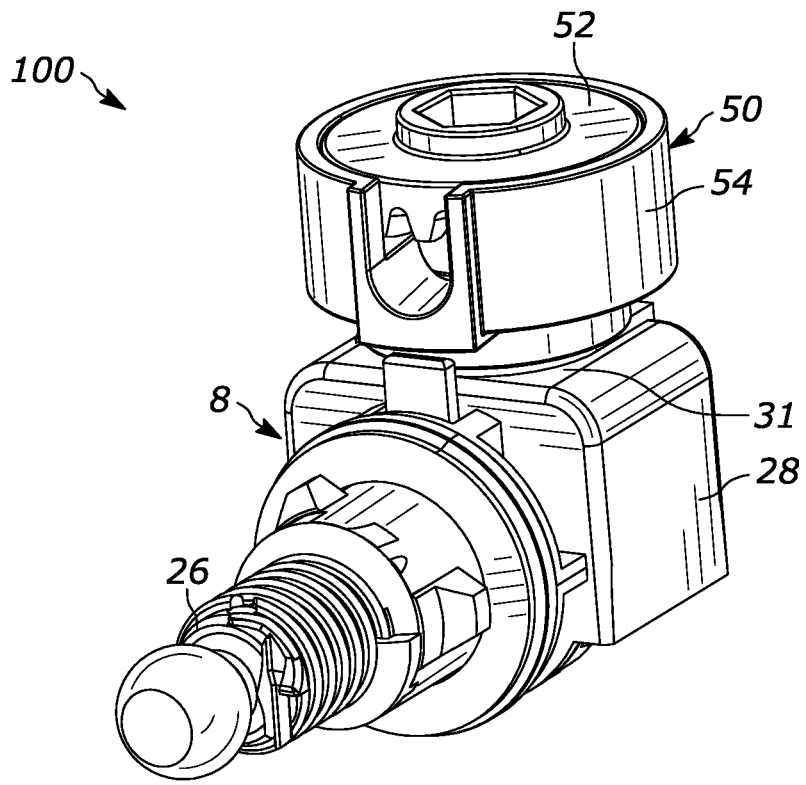
FIG. 12 is a front perspective view of an exemplary supplemented adjuster including the supplemental driver assembly of FIG. 5 coupled to the adjuster of FIG. 1.
Figure 13:
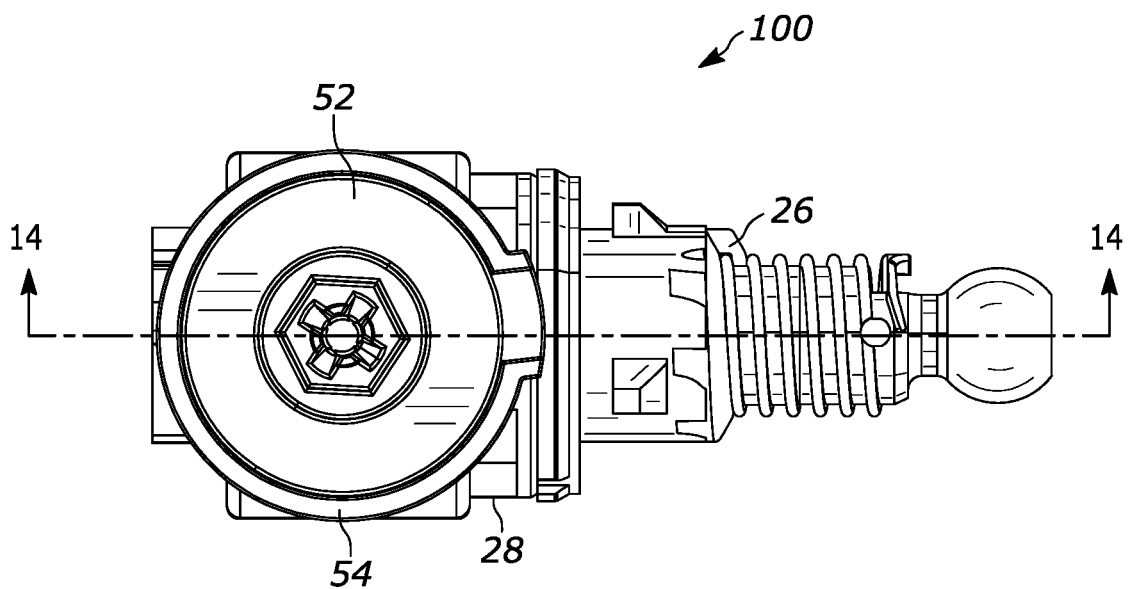
FIG. 13 is a top view of the supplemented adjuster of FIG. 12.
Figure 14:
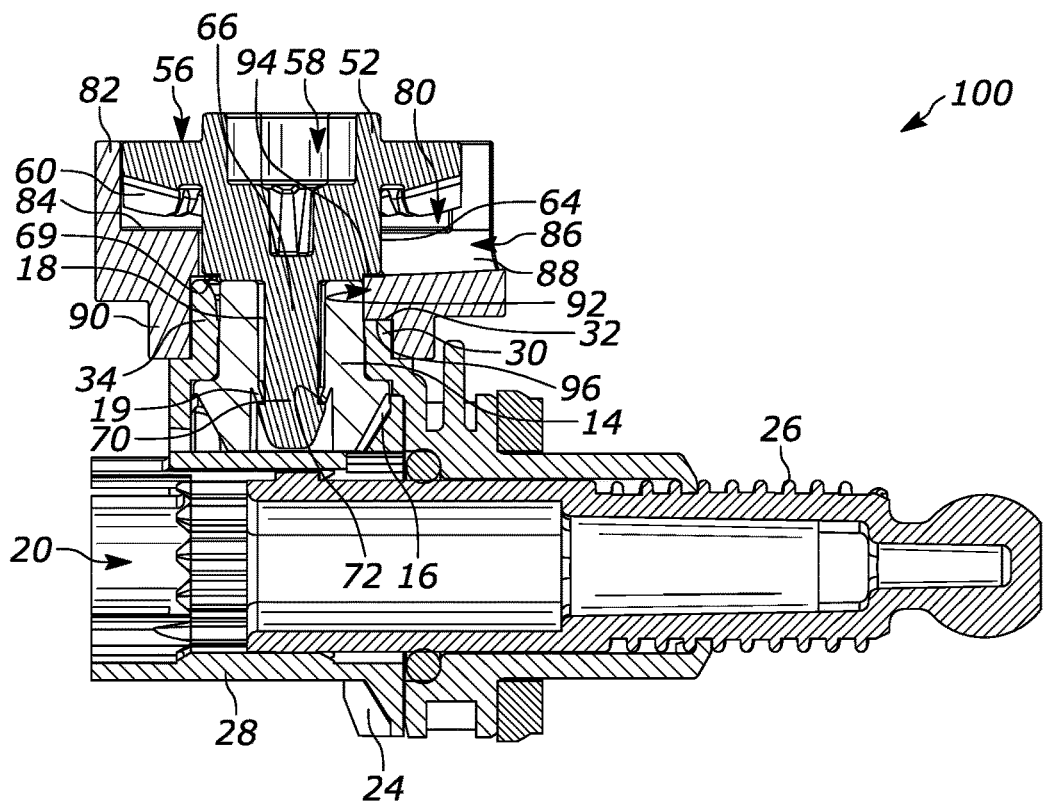
FIG. 14 is a cross-sectional view of the supplemented adjuster of FIG. 12 taken along line 14-14 of FIG. 13.
Figure 16:
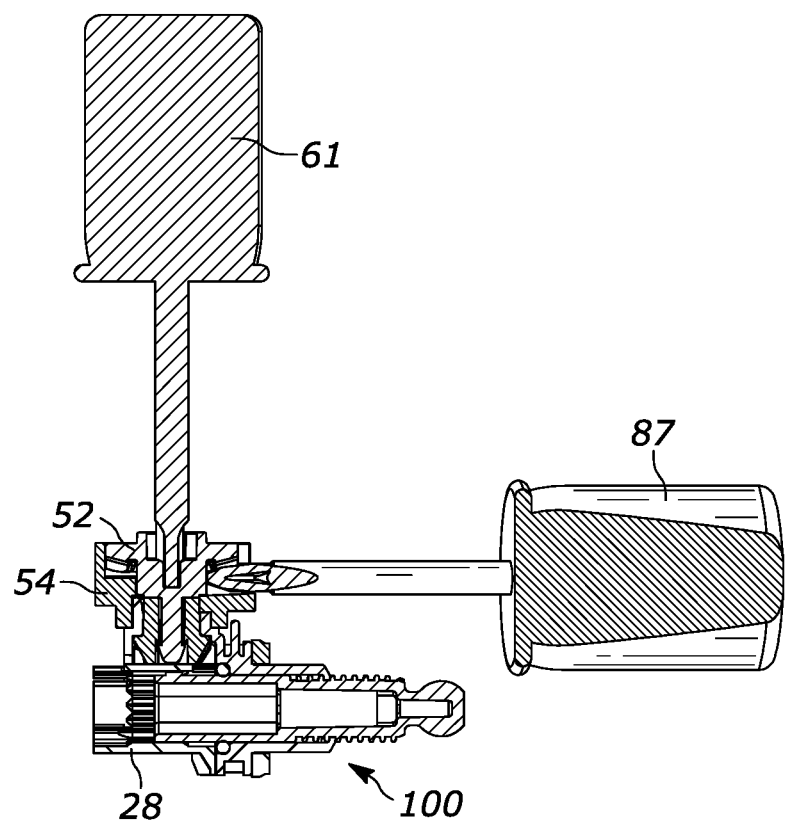
FIG. 16 is a view of the supplemented adjuster of FIG. 14 with a top adjuster tool and a side adjuster tool added to show the interface with the supplemented adjuster.

Referring now to FIGS. 12-14, an exemplary supplemented adjuster 100 is shown in perspective, top, and cross-sectional views. The supplemented adjuster 100 includes the supplemental driver assembly 50 coupled to the adjuster 8. More particularly, the supplemental drive guide housing 54 has been placed onto the adjuster housing 28 with the alignment slots 98 aligned with the alignment tabs 34 and the collar 90 receiving the annular header 30 therein until abutment of the annular header top surface 32 with the lower shoulder 96. The supplemental drive gear 52 is then inserted into the supplemental drive guide housing 54 with the output shaft 66 being received within the engagement cavity 18 of the input shaft 14 of the adjuster 8 until the engagement head 70 passes the locking tabs 19, allowing the locking tabs 19 to snap over the upper ledge 72 of the engagement head 70 to longitudinally secure the supplemental drive gear 52 within the adjuster input shaft 14, and thereby securing the supplemental driver assembly 50 to the adjuster 8. Once secured in place, the supplemented adjuster 100 provides additional adjustment access points. As noted above, the drive guide passage 86 can be positioned anywhere along the pocket wall 82 during manufacturing to provide a desired side adjuster tool receiving angle relative to the adjuster. As the upper portion 56 of the supplemental drive gear 52 includes the central tool engagement recess 58, the supplemented adjuster 100 can be adjusted by engaging the side adjuster tool 87 into the drive guide passage 86 or by inserting the top adjuster tool 61 into the engagement recess 58 as seen in FIG. 16.

In addition to providing additional angles for adjustment access, in at least some embodiments, the supplemental drive gear teeth 60 can be sized and spaced to provide a finer or courser adjustment (rotation of the ball stud 26) than achieved using the engagement recess 58. For example, turns of the top adjuster tool 61 engaged with the engagement recess 58 can provide a course adjustment (e.g., 1.0 mm per tool revolution) while turns of the side adjustment tool 87 engaged with the primary drive gear teeth 16 can provide a finer adjustment (e.g., 0.2 mm per tool revolution). Further, in at least some embodiments, the top adjuster tool 61 and the side adjustment tool 87 can be identical.

Figure 15:
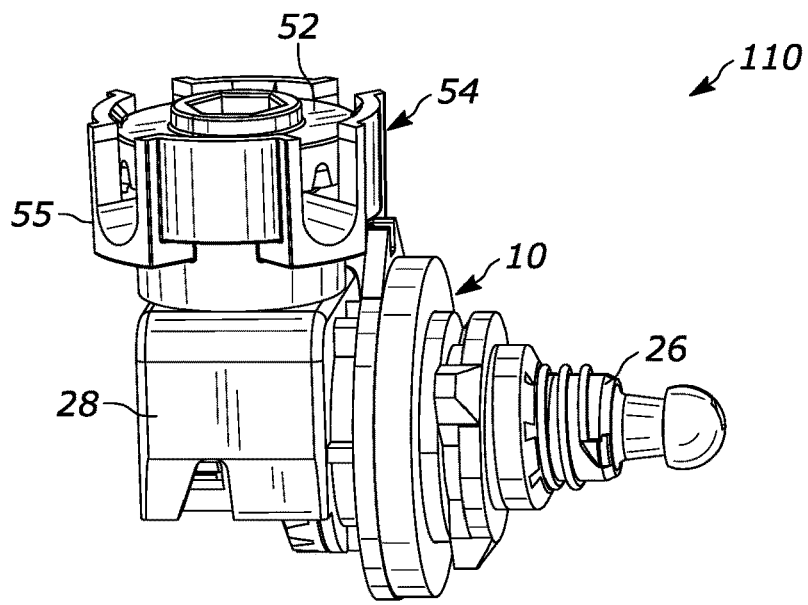
FIG. 15 is a side perspective view of another exemplary supplemented adjuster, including the supplemental drive guide housing of FIG. 10 coupled to the adjuster of FIG. 3.
Figure 17:
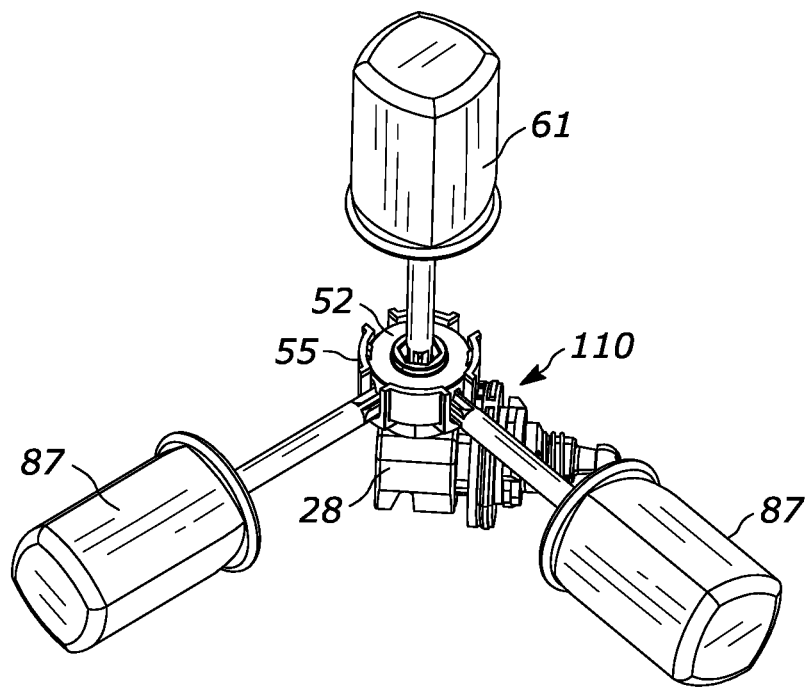
FIG. 17 is a view of the supplemented adjuster of FIG. 15 with a top adjuster tool and multiple side adjuster tools added to show the interface with the supplemented adjuster.

As noted above, the supplemental driver assembly 50 can be coupled to various types of adjusters, such as adjusters 8, 9. As such for illustrative purposes, supplemented adjuster 110 is shown in FIG. 15, wherein the supplemental driver assembly 50 with four drive guide passages 86 and two alignment slots 98 is shown coupled to the adjuster 10. Similar to the supplemented adjuster 100 shown in FIG. 12, the supplemental drive guide housing 55 has been placed onto the adjuster housing 28 with the alignment slots 98 aligned with the alignment tabs 34 and the collar 90 receiving the annular header 30 therein until abutment of the annular header top surface 32 with the lower shoulder 96. The supplemental drive gear 52 is then inserted into the supplemental drive guide housing 55 with the output shaft 66 being received within the engagement cavity 18 of the input shaft 14 of the adjuster 10 until the engagement head 70 passes the locking tabs 19, allowing the locking tabs 19 to snap over the upper ledge 72 of the engagement head 70 to longitudinally secure the supplemental drive gear 52 within the adjuster input shaft 14, and thereby securing the supplemental driver assembly 50 to the adjuster 10. Similar to the supplemented adjuster 100, the supplemented adjuster 110 can be adjusted by engaging the side adjuster tool 87 into any one of the drive guide passages 86 or by inserting the top adjuster tool 61 into the engagement recess 58 as seen in FIG. 17.

The supplemental driver assembly 50 has been illustrated as a separate assembly securable to the adjuster 8, although in at least some embodiments, one or more portions of the supplemental driver assembly 50 can be formed integrally with the adjuster 8, for example the supplemental drive guide housing 54 can be formed integrally with the adjuster housing 28, etc.

Although the invention has been herein described in what is perceived to be the most practical and preferred embodiments, it is to be understood that the invention is not intended to be limited to the specific embodiments set forth above, but include modified forms of those embodiments including portions of the embodiments and combinations of elements of different embodiments as come within the scope of the following claims. Further, it is recognized that modifications may be made by one of skill in the art of the invention without departing from the spirit or intent of the invention and, therefore, the invention is to be taken as including all reasonable equivalents to the subject matter of the appended claims and the description of the invention herein. And, although certain advantages of different embodiments and disadvantages of certain prior art are described, no single claim must realize every or any benefit or overcome every or any disadvantage.

I claim:

1. A supplemental driver assembly comprising:
   a supplemental drive gear comprising:
   an upper portion including a tool engagement recess and circumferential supplemental drive gear teeth; and
   a cylindrical neck extending axially from the upper portion to an output shaft having one or more drive engagement protrusions; and
   a drive guide housing comprising:
   a gear pocket for housing the upper portion of the supplemental drive gear, the gear pocket comprising a cylindrical pocket wall extending from a perimeter of a pocket floor, the pocket wall having a drive guide passage extending therethrough for receiving a side adjuster tool, wherein the gear pocket receives the supplemental drive gear and allows for rotational movement of the upper portion within the gear pocket; and
   a cylindrical collar extending axially from the gear pocket.

2. The supplemental driver assembly of claim 1, wherein the drive engagement protrusions include one or more splines extending longitudinally along the output shaft.

3. The supplemental driver assembly of claim 2, wherein the supplemental drive gear further includes an engagement head extending axially from the output shaft.

4. The supplemental driver assembly of claim 3, wherein the engagement head is tapered and includes a circumferential upper ledge.

5. The supplemental driver assembly of claim 3, wherein the drive guide passage includes a groove extending through both the pocket wall and the pocket floor of the drive guide housing.

6. The supplemental driver assembly of claim 5, wherein the drive guide housing includes two or more spaced drive guide passages.

7. The supplemental driver assembly of claim 5, wherein the drive guide housing includes four or more spaced drive guide passages.

8. The supplemental driver assembly of claim 2, wherein the cylindrical collar includes one or more radially inward extending protrusions.

9. The supplemental driver assembly of claim 2, wherein the cylindrical collar includes one or more alignment slots.

10. The supplemental driver assembly of claim 1, wherein the drive guide passage includes a groove extending through both the pocket wall and the pocket floor of the drive guide housing, and the drive guide housing includes one or more radially inward extending protrusions with one or more alignment slots situated therebetween.

11. The supplemental driver assembly of claim 1, wherein the drive guide housing includes one or more radially inward extending protrusions each having an upper shoulder and a lower shoulder, and wherein the upper shoulder receives a neck bottom of the neck rotatably thereon.

12. The supplemental driver assembly of claim 11, wherein the supplemental drive gear teeth extend perpendicularly from the upper portion and towards the pocket floor of the drive guide housing, and wherein the supplemental drive gear teeth are spaced from a groove of the drive guide to allow for insertion and engagement of a gear adjustment tool.

13. The supplemental driver assembly of claim 1, wherein the drive guide housing is matingly engageable with a discrete adjuster housing.

14. The supplemental driver assembly of claim 1, wherein the cylindrical collar matingly receives therein an annular header of a discrete adjuster housing.

15. The supplemental driver assembly of claim 1, wherein the output shaft of the supplemental drive gear matingly engages with an engagement cavity of an adjuster input shaft of an adjuster, wherein rotation of the output shaft causes rotation of the input shaft.

16. The supplemental driver assembly of claim 3, wherein the engagement head includes a ledge that engages locking tabs extending within an engagement cavity of an adjuster input shaft of an adjuster, such that the supplemental drive gear is longitudinally secured to the adjuster input shaft.

17. A supplemented adjuster comprising:
a primary drive gear with an input shaft having primary drive gear teeth at a first end and an engagement cavity at a second end;
a ball stud gear having a cylindrical body and ball stud gear teeth matingly engaged with the primary drive gear teeth to provide rotation of the ball stud gear;
a ball stud matingly engaged with the ball stud gear, wherein rotation of the ball stud gear rotates the ball stud;
an adjuster housing for receiving at least partially therein, the ball stud gear, the ball stud, and the primary drive gear, the adjuster housing including an annular header extending from an upper surface;
a supplemental drive gear comprising:
an upper portion including a tool engagement recess and circumferential supplemental drive gear teeth;
a cylindrical neck having a neck bottom and extending axially from the upper portion to an output shaft having one or more drive engagement protrusions, wherein the drive engagement protrusions are matingly received within the engagement cavity to provide a rotational interlock therebetween; and
an engagement head extending from the output shaft;
a drive guide housing comprising:
a gear pocket for housing the upper portion of the supplemental drive gear, the gear pocket comprising a cylindrical pocket wall extending from a perimeter of a pocket floor, the pocket wall having a drive guide passage extending therethrough for receiving a side adjuster tool, wherein the gear pocket receives the supplemental drive gear and allows for rotational movement of the upper portion within the gear pocket; and
a cylindrical collar extending axially from the gear pocket, wherein the collar is selectively coupled to the annular header of the adjuster housing, and wherein rotation of the supplemental drive gear via the tool engagement recess provides rotation of the primary drive gear and the ball stud.

18. The supplemented adjuster of claim 17, wherein the drive guide housing further comprises one or more radially inward extending protrusions each having an upper shoulder and a lower shoulder, wherein the upper shoulder receives at least in part, the neck bottom rotatably thereon, and wherein the lower shoulder abuts an annular header top surface.

19. The supplemented adjuster of claim 17, wherein the engagement cavity includes one or more outwardly biased locking tabs that engage a ledge of the engagement head during insertion of the engagement head to longitudinally secure the supplemental drive gear to the input shaft.

20. The supplemented adjuster of claim 17, further including one or more alignment tabs extending vertically from the annular header for mating engagement with one or more corresponding alignment slots in the cylindrical collar.

* * * * *